United States Patent
Toal et al.

(10) Patent No.: US 10,666,699 B2
(45) Date of Patent: *May 26, 2020

(54) LIVE EDGE DETECTION DURING VIDEO PLAYBACK

(71) Applicant: HULU, LLC, Santa Monica, CA (US)

(72) Inventors: Matthew Toal, Seattle, WA (US);
Esther Lee, Torrance, CA (US);
Chuang Xie, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,733

(22) Filed: Apr. 24, 2019

(65) Prior Publication Data

US 2019/0253467 A1    Aug. 15, 2019

Related U.S. Application Data

(63) Continuation of application No. 15/873,556, filed on Jan. 17, 2018, now Pat. No. 10,298,643.

(51) Int. Cl.
*H04L 29/06* (2006.01)
*H04N 21/472* (2011.01)
*H04N 21/2343* (2011.01)
*H04N 21/2187* (2011.01)
*H04N 21/262* (2011.01)
*H04N 21/845* (2011.01)
*H04L 29/08* (2006.01)
(Continued)

(52) U.S. Cl.
CPC ...... *H04L 65/4084* (2013.01); *H04L 65/1086* (2013.01); *H04L 65/4076* (2013.01); *H04L 65/608* (2013.01); *H04L 67/22* (2013.01); *H04N 21/2187* (2013.01); *H04N 21/234* (2013.01); *H04N 21/23439* (2013.01); *H04N 21/26258* (2013.01); *H04N 21/47217* (2013.01); *H04N 21/8456* (2013.01); *H04L 65/60* (2013.01); *H04L 67/02* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 7,020,892 B2 | 3/2006 | Levesque et al. | |
| 2003/0219222 A1 | 11/2003 | Fraleu et al. | |
| 2009/0313382 A1 | 12/2009 | Bouazizi | |

OTHER PUBLICATIONS

U.S. Appl. No. 15/873,556, filed Jan. 17, 2018 by Toal et al. (Unpublished. Copy available via USPTO's IFW System).

*Primary Examiner* — Hung Q Dang
(74) *Attorney, Agent, or Firm* — Fountainhead Law Group, PC

(57) ABSTRACT

In some embodiments, a method may calculates a latest seekable point for a live edge of a media program and determines a current playback position of the media program. The latest seekable point for the live edge corresponds to a latest time in the media program that can be played within a threshold. The method selects among a first range, a second range, and a third range based on the current playback position and the latest seekable point. A first feature is enabled when the first range is selected, a second feature is enabled when the second range is selected, and whichever of the first feature or the second feature that is currently enabled is not changed to continue displaying whichever of the first feature and the second feature that is currently enabled when the third range is selected.

20 Claims, 10 Drawing Sheets

(51) Int. Cl.
*H04N 21/234* (2011.01)
*H04N 21/81* (2011.01)

LIVE EDGE DETECTION DURING VIDEO PLAYBACK

CROSS REFERENCE TO RELATED APPLICATIONS

This application is a continuation application and, pursuant to 35 U.S.C. § 120, is entitled to and claims the benefit of earlier filed application U.S. application Ser. No. 15/873,556 filed Jan. 17, 2018, the content of which is incorporated herein by reference in its entirety for all purposes.

BACKGROUND

During playback of a live media program, a user may be watching the media program at the live edge. The live edge is the point at which the user cannot seek any further or the user is at the latest seekable point in the media program—i.e., the user is considered "live". The client device may receive new manifests that define new video segments to request. For example, the video segment may define where to retrieve video from a range of the times 1:00 to 1:10 in the video. The live edge may be the latest time in the video as defined by the manifest received, such as 1:10 (or possibly 1:08-1:10). The client device may detect when the media player is playing the video at the live edge or not playing the video at the live edge. However, there may be instances when the media program may jump back and forth between playing at the live edge and not playing at the live edge when an additional manifest is received by the client device. For instance, when a new manifest is received, the latest seekable point increases, such as from 1:10 to 1:20. If the current playback time is 1:10, 1:12, or any time before 1:20, then the client device may not consider the user to be watching live. Eventually, playback would reach the time 1:20, and the user would be considered to be playing at the live edge, but then another manifest will be received with an additional segment. This may cause problems because the client device may switch from offering different features to the user, which may be confusing to the user watching the video.

DETAILED DESCRIPTION

Figure 1:
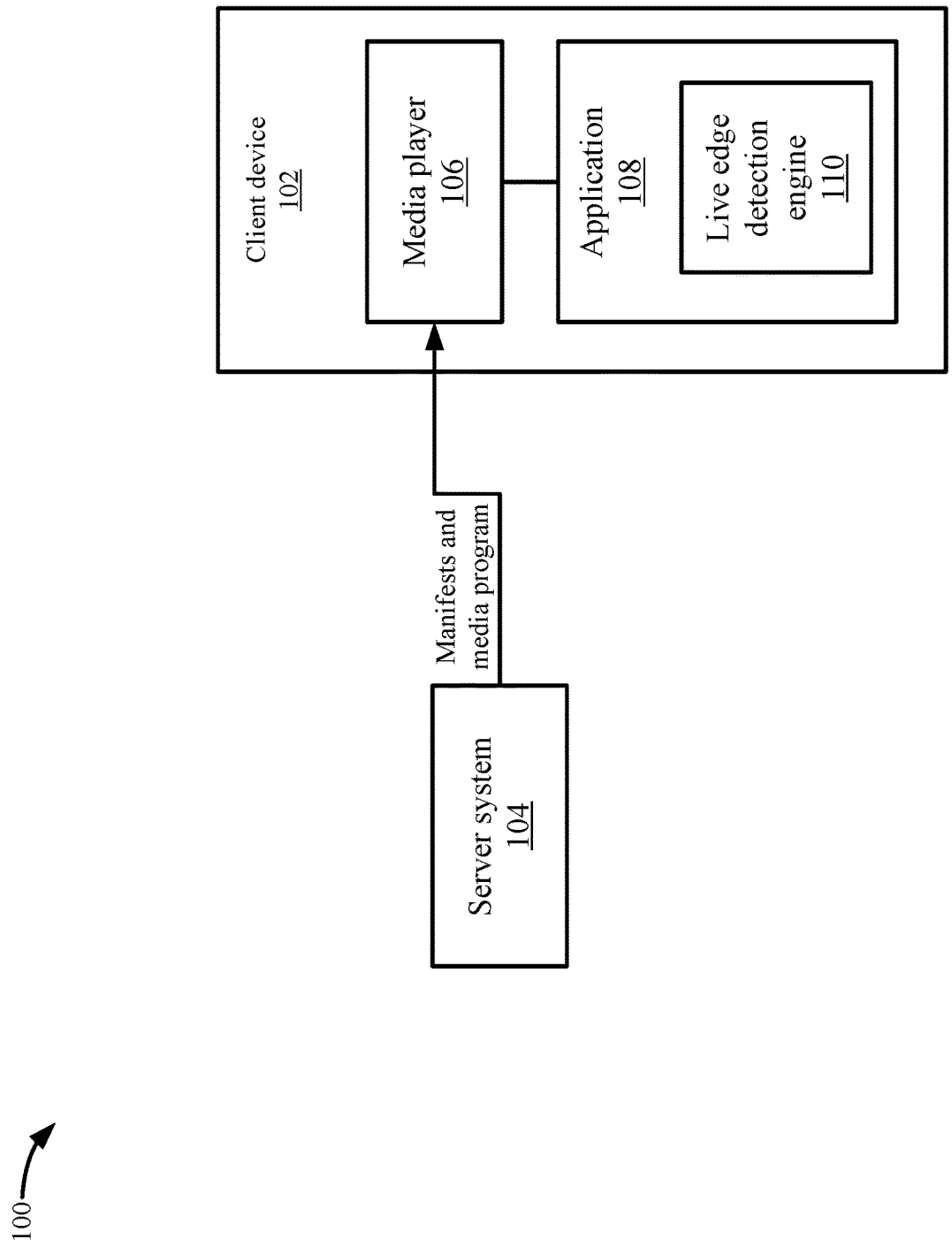
FIG. 1 depicts a simplified system for detecting the live edge according to some embodiments.

Described herein are techniques for a video playback system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A client device may play a media program using a media player. In some embodiments, the media program may be offered via a live programming service that offers media programs via a linear schedule. During playback of the media program, a user may be watching the media program live (e.g., watching-live) or not live (e.g., not watching-live). Not watching live may be when the user is watching the video with some delay above a threshold (e.g., the user is 4 seconds behind the live broadcast). When watching the media program live, the media program may be at or close to the live edge, which is the latest seekable point available to be played in the media program. For example, in a live media program, the latest seekable point may correspond to the latest time in the video that can be played by media player 106 that is defined by a video segment received in a manifest. A threshold may be used to determine whether playback is at the live edge such that playback at small distances from the latest seekable point are still considered the live edge.

An application may offer different features based on whether the user is watching live or not watching live. In some embodiments, the application may offer a first feature that allows the user to seek to the live edge, which may be implemented using a go-to-live button or other controls on an interface, such as the media player. When the user selects the go-to-live button, the media player may automatically seek to the live edge. When the user is watching-live, the application may configure a second feature, which may display a watching-live button or other controls that displays a message indicating the user is watching-live, which means the user is at the furthest seekable point in the media program.

During live playback, the media player receives new manifests or updates to a manifest at regular intervals. The new manifest may add a certain amount of time to the latest possible seekable range, which may be a range of time in which a user can seek. The range may include a position that is referred to as the live edge and then go back to the beginning of the media program. The manifest may include six seconds of video, but other amounts of time may be appreciated. The addition of the amount of time from the manifest to the seekable range may cause the application to consider the playback to be not in the watching-live range. For example, the playback time may be 10:00. However, when a new segment is received for the video located from 10:00 to 10:06, the seekable range jumps to 10:06. The playback time still is at 10:00, but increasing linearly (from 10:00 to 10:01 to 10:02, etc.), and does not jump. As discussed in the Background, this may cause the application to cycle between the first feature and second feature. This is because the increase in the seekable range may put the current playback time in the not watching live category (e.g., 10:00 is six seconds behind 10:06 and thus not watching live). As the user continues to watch the video, the current playback time increases and the playback time becomes closer to the latest seekable range position as no new manifests are received. That is, the seekable range stays at 10:06 while playback time increases. Eventually, the application would consider the user to be at the live edge, such as when the current playback time reaches 10:05 or 10:06. However, this point may be right before another manifest is received that includes the next segment thereby increasing the seekable time by another six seconds causing the user to be considered not watching live again.

To avoid the switching between the first feature and the second feature, the application may include different ranges that are used to determine if the user falls within the first feature or the second feature. In some embodiments, the application uses a first range that is considered to be in the live range and the user is considered to be watching-live, a trailing range where the user is considered to be not watching-live, and a third range in between the first range and the second range where the user is considered to be in whatever state the user was before entering into the second range. Using these ranges may reduce the amount of switching between the first feature and the second feature. For example, if the application is enabling and disabling a watching-live button and a go-to-live button, flickering of the buttons may occur even though the user is not changing the pace of the playback of the media program. The use of the three ranges may reduce the amount of flickering on the media player. This may improve the user interface as the user would not see the flickering as much and also reduce the amount of computer processing required to change the display of the buttons. Also, some embodiments may conceal small network issues from users. If there are small network issues that may cause the playback to lag slightly from "true" live watching (sometimes slight enough the user may not even notice, but enough to increase slightly that gap between where the user is watching and where the live stream actually is), the media player can continue to keep the user in the correct "live" state, until such time as enough lag has accrued that it makes sense to show the user that they are no longer live. The media player provides an overall more consistent user interface experience when the gap increases for any reason.

System Overview

FIG. 1 depicts a simplified system 100 for detecting the live edge according to some embodiments. System 100 includes a client device 102 and server system 104. Client device 102 may receive a media program (e.g., video) from server system 104 and play that media program in a media player 106, which may be part of a user interface being displayed on client device 102. When features are described as being displayed in media player 106, it will be recognized that those features could be displayed in other areas of the user interface.

In some embodiments, client device 102 may receive a manifest that is used to request segments of the media program from server system 104. The manifest may list segments of a certain length in the video, such as segments that are between six to ten seconds. Although server system 104 is shown as sending the manifest and media program to client device 102, it will be understood that the manifest and media program may be received from different entities. For example, a video delivery service may send the manifest to media player 106, and then media player 106 may request the media program from server system 104, which may be a content delivery network (CDN).

As discussed above, the live media program is part of a live media service that offers videos on a linear schedule that can be viewed when offered on the schedule. This is different from on demand videos, which can be requested at any time. In a live media program, media player 106 receives new manifests throughout the playback that each contain one or more new segments. Although new manifests are described, it will be understood a new manifest may be updating an existing manifest. That is, media player 106 may maintain a manifest that lists all the received segments of video and receive updates or new manifests for new segments. Media player 106 uses the new manifest to request a new segment. In some instances, the content for a live media program is generated in real-time, such as for a live sporting event. In other examples, media programs are broadcast during the time slots in the linear schedule.

An application 108 may interact with media player 106 to enable and disable features. For example, application 108 may offer a first feature when the user is considered watching-live and a second feature when the user is not considered watching-live. In some examples, the first feature may be a seek-to-live button and the second feature may be a watching-live button; however, other types of controls may be used. The seek-to-live button, when selected by a user, causes media player 106 to seek to the live edge. The watching-live button indicates to the user that the user is watching the media program at the live edge. In some embodiments, the watching-live button may not perform any actions if selected. That is, the watching-live button displays a message such that the user knows that the media program is playing live. However, in other embodiments, the watching-live button may perform actions if selected, such as displaying information about the live program.

To determine which state the user is in, such as the watching-live state or not watching-live state, application 108 uses a live edge detection engine 110 to detect the state and determine when to change the state. As discussed above, live edge detection engine 110 may use three ranges when determining when to change the state. This process will be described in more detail below.

Interface Examples

Figure 2A:
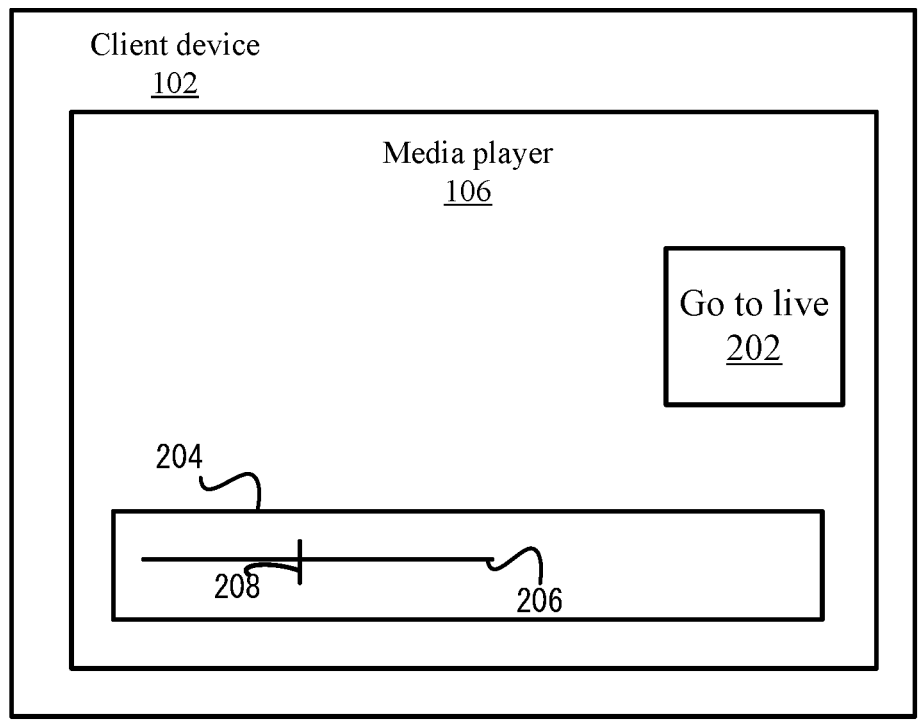
FIG. 2A depicts an example when the media program is in a not watching-live state according to some embodiments.
Figure 2B:
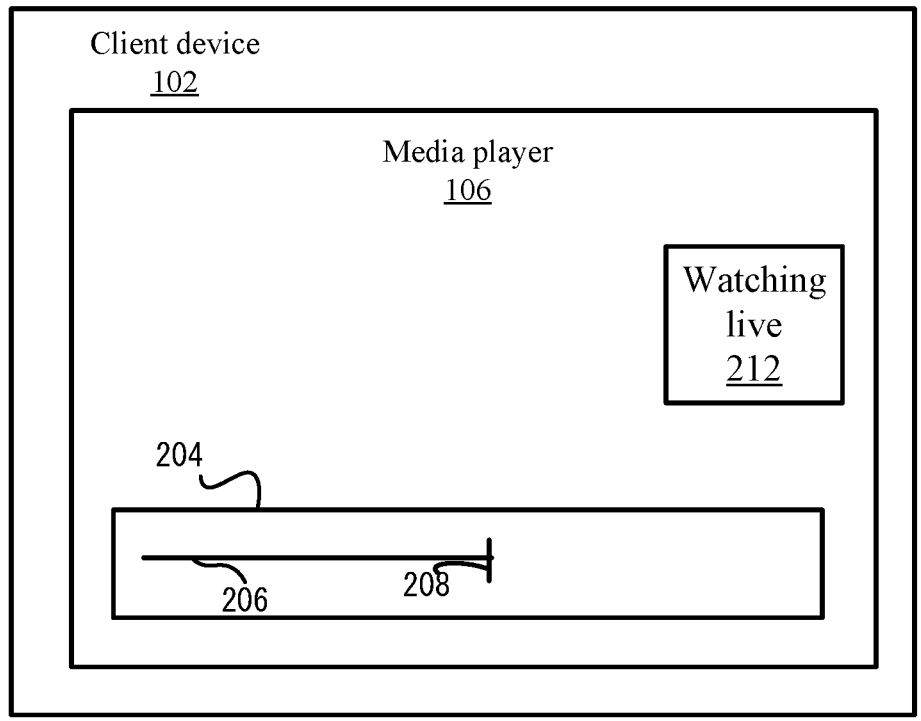
FIG. 2B depicts an example of a media player when the media program is in a watching-live state according to some embodiments.

FIGS. 2A and 2B depict examples of media player 106 when different features are enabled according to some embodiments. FIG. 2A depicts an example when the media program is in a not watching-live state according to some embodiments. Media player 106 may receive an input from the user to display a menu, which includes the controls shown. The user may also minimize the menu, which causes the controls to not be displayed.

When the menu is enabled, media player 106 includes a first feature that implements a go-to-live button 202. Although a button is described, other controls may be used to provide the feature, such as a drop-down menu, other icons, audio inputs/outputs, etc. When the user is not watching the video at the live edge, the go-to-live feature is enabled. For example, a progress bar 204 may summarize the playback state. A timeline 206 may indicate the seekable range for the media program. That is, the timeline shows the latest point in which the user can view. An indicator 208 indicates the current playback position of the media program. As shown in FIG. 2A, the current playback position is behind the latest seekable range (e.g., "live") by a threshold.

When go-to-live button 202 is selected, application 108 may perform an action, such as automatically seeking to the live edge. The seeking may be performed in response to the selection of go-to-live button 202 and not require any other input from the user. This is convenient for a user because the user does not have to fast forward the video to reach the live edge, which may be slower than using the go-to-live button 202. For example, application 108 may jump the media program to the live edge without showing any fast-forwarded video on media player 106 when the user selects go-to-live button 202. This provides a faster seek for the user.

FIG. 2B depicts an example of media player 106 when the media program is in a watching-live state according to some embodiments. When a user is watching-live, the user is currently watching the media program at the live edge. Watching live may mean that the media program is at the live edge position or at a position that is within a threshold of the live edge. When this occurs, media player 106 displays a second feature, such as a watching-live button 212. Watching-live button 212 may offer a different functionality from go-to-live button 202. For example, watching-live button 212 may only indicate to the user that the user is watching-live and does not perform an action if selected. In contrast, go-to-live button 202 causes media player 106 to seek to the live edge. In some embodiments, the watching-live button may indicate to the user that the user is at the furthest seekable point within a threshold. As shown in progress bar 204, indicator 208 is at the latest seekable point in timeline 206.

Live Edge Detection

Figure 3:
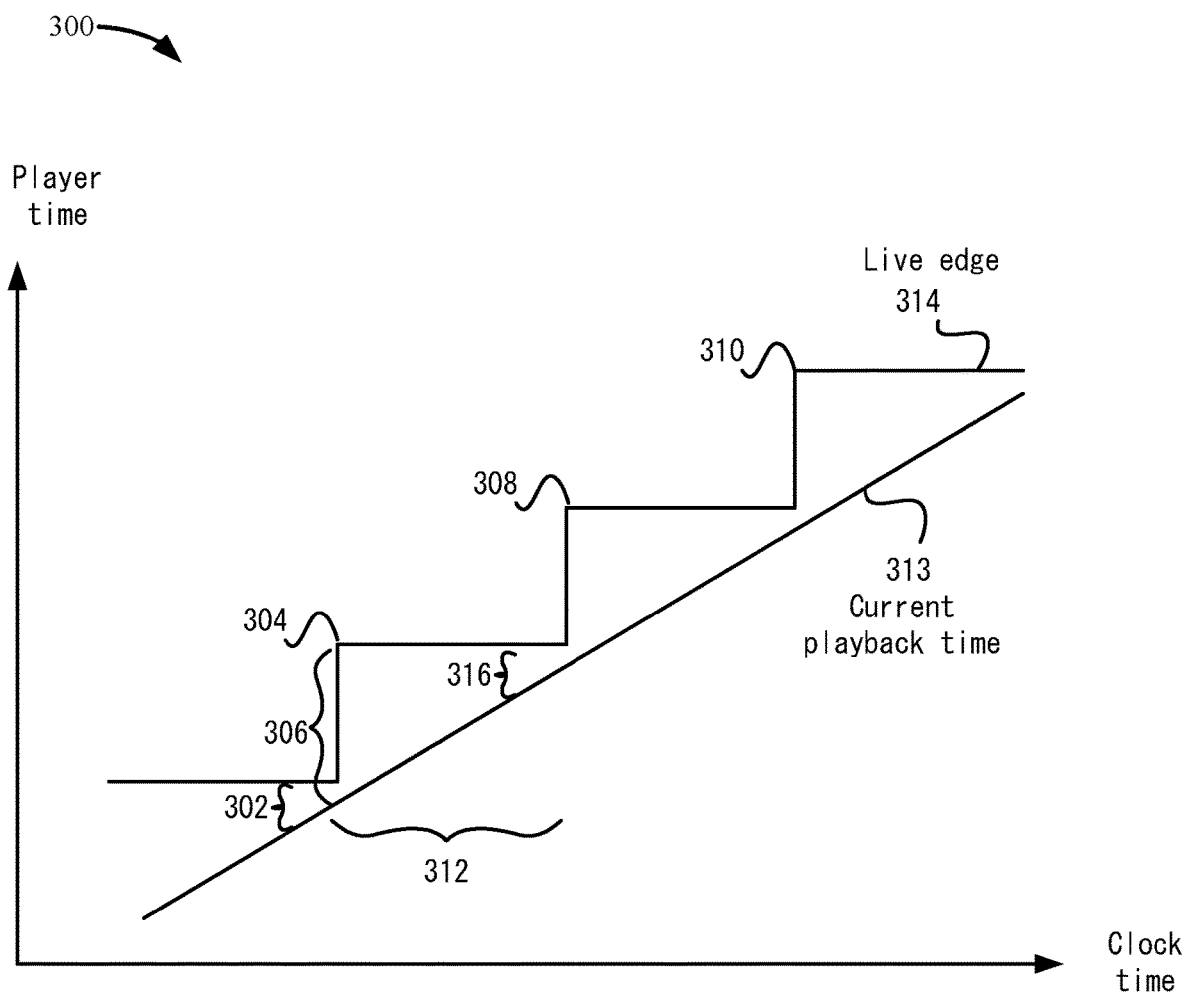
FIG. 3 depicts a graph showing the seekable range and current playback time according to some embodiments.

FIG. 3 depicts a graph 300 showing the seekable range and current playback time according to some embodiments. The Y axis of graph 300 shows the player time and the X axis shows the clock time. The player time is the time associated with the seekable range in the video and the clock time is associated with real world time or the live linear playback time. The live edge is depicted at 314 and represents the live edge of the seekable range. The current playback time is shown at 313.

When linear playback occurs, the current playback time may increase at a linear pace compared to player time and clock time as shown. However, if the user pauses the playback or seeks to different points, the current playback time may not increase at a linear pace. For example, the current playback time may stop going upward if the playback is paused or go down if the playback is rewound or reversed.

The live edge may change based on the current seekable range. As discussed above, when a manifest is received that includes a segment that can be requested, the live edge may increase by that amount defined by the segment. At points 304, 308, and 310, a new manifest is received with an additional segment that adds additional time to the seekable range. This is why the live edge jumps up at these points from being flat. The live edge is flat after an update to the manifest is received because no further changes to the seekable range are received until a new update to the manifest is received. That is, if the segment is for video from 10:00 to 10:06, the seekable ranges stays at 10:06 until a new update is received. However, the current playback increases as playback continues, such as linearly if no pauses or rewinds occur, such as from 10:00 to 10:01, 10:02, etc. For example, the seekable range may be at 10:00 and then when a manifest is received with a new segment at 304, the seekable range jumps to 10:06 by adding a six second segment to the 10:00 time. The current playback time does not jump, but continues to increase linearly.

The distance from the live edge thus changes from a first distance shown at 302 to a second distance shown at 306 when media player 106 receives the new manifest. If the threshold is smaller than the range at 306 when considering if media player 106 is at the live edge, then application 108 would consider the playback as being in the state of not watching-live when the manifest is received at 304. However, this may be undesirable as the user is still watching the video in a linear fashion and as playback continues will eventually catch up and be around the live edge because a new manifest with a new segment is not received for a period of time as shown at 312. For example, at 316, application 108 may consider the media program to be in the watching-live state again. But, at 308, a manifest with another segment is received, which increases the seekable range and application 108 now considers the media program to be in the not watching-live state. As discussed above, application 108 uses different ranges to determine when to change state between the watching-live feature and the not watching-live feature, which may limit the cycling between states.

State Determination

Figure 4:
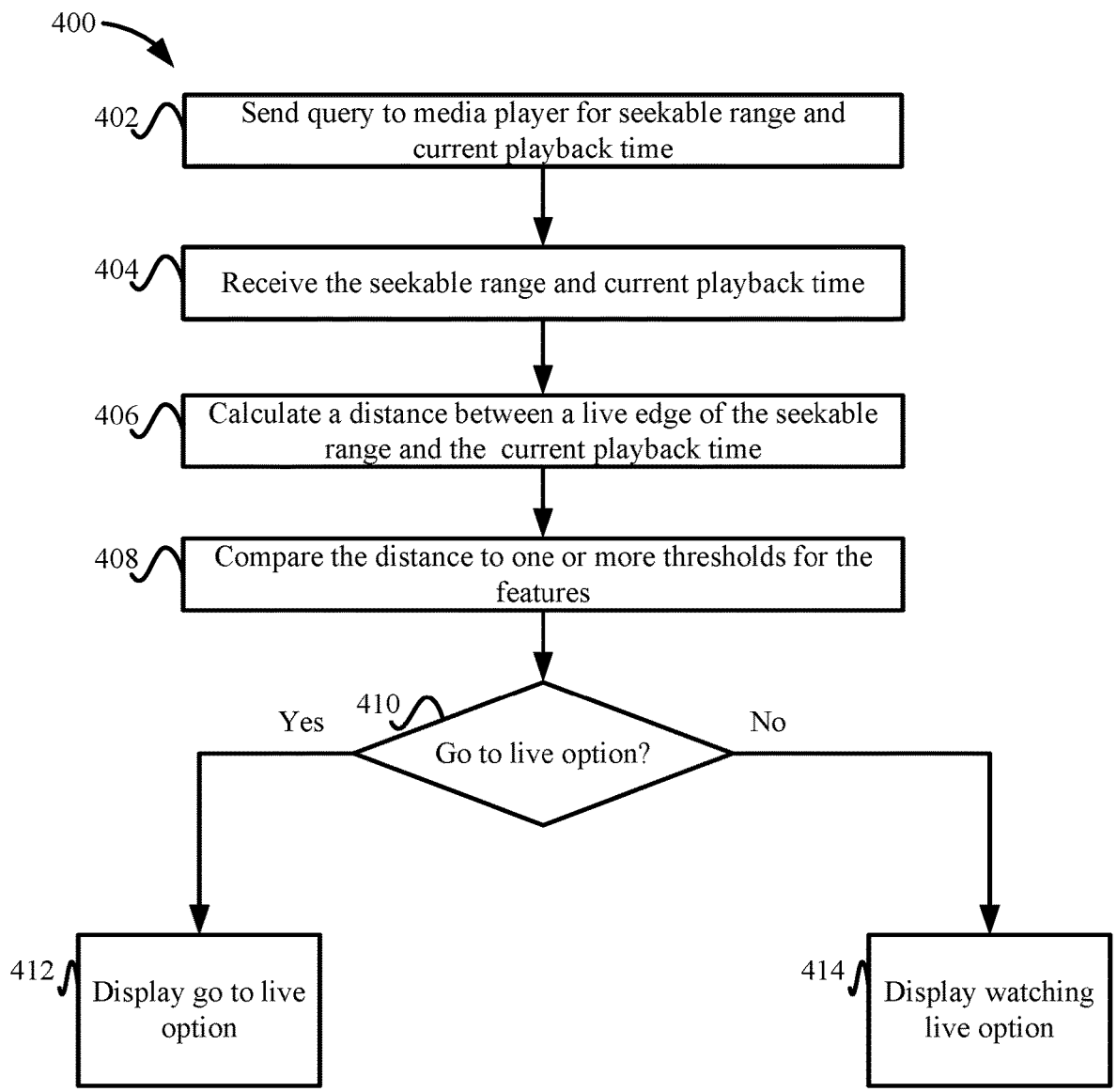
FIG. 4 depicts a simplified flowchart of a method for determining which feature to enable according to some embodiments.

FIG. 4 depicts a simplified flowchart 400 of a method for determining which feature to enable according to some embodiments. At 402, application 108 sends a query to media player 106 for the seekable range and current playback time. In some embodiments, media player 106 determines the seekable range by the latest possible point defined in the manifest received for the media program. In other embodiments, media player 106 may determine the seekable range by hiding a certain amount of time, such as ten seconds, from application 108. For example, the manifest may be at 10:10, but media player 106 considers the latest seekable time at 10:00. The current playback time is the current time in which the user is viewing the media program.

At 404, application 108 receives the seekable range and current playback time from media player 106. In some embodiments, application 108 may query media player 106 at certain intervals. For example, application 108 may query media player 106 multiple times per second. However, in other embodiments, media player 106 may push the updates to application 108. The seekable range that is received may be a range from the beginning of the live media program to the live edge. Or the seekable range position of the live edge may only be received.

In some embodiments, media player 106 may receive an input from a user to display a menu. For example, the menu may display progress bar 204 in addition to one of go-to-live button 202 or watching-live button 212. When a user has not enabled the display of the menu, then some embodiments may not determine whether the go-to-live feature or watch-live feature should be enabled and the following steps may not be performed. However, even when media player 106 does not display the menu, application 108 may still perform the following calculations, but not display the buttons.

At 406, live edge detection engine 110 calculates a distance between a live edge of the seekable range and the current playback time. The distance may be the difference between the latest time available to application 108 to seek and the current playback time.

At 408, live edge detection engine 110 compares the distance to one or more thresholds for the features. As will be discussed in more detail below, three different ranges may be used. However, it will be understood that a different number of ranges may be used from the three ranges described.

At 410, live edge detection engine 110 determines if the go-to-live feature should be enabled. For example, if the distance is within a threshold to the live edge, then, at 412, live edge detection engine 110 determines that the go-to-live feature should be displayed. If the distance is not within the threshold to the live edge, then, at 414, live edge detection engine 110 determines that the watching-live feature should be displayed.

Figure 5:
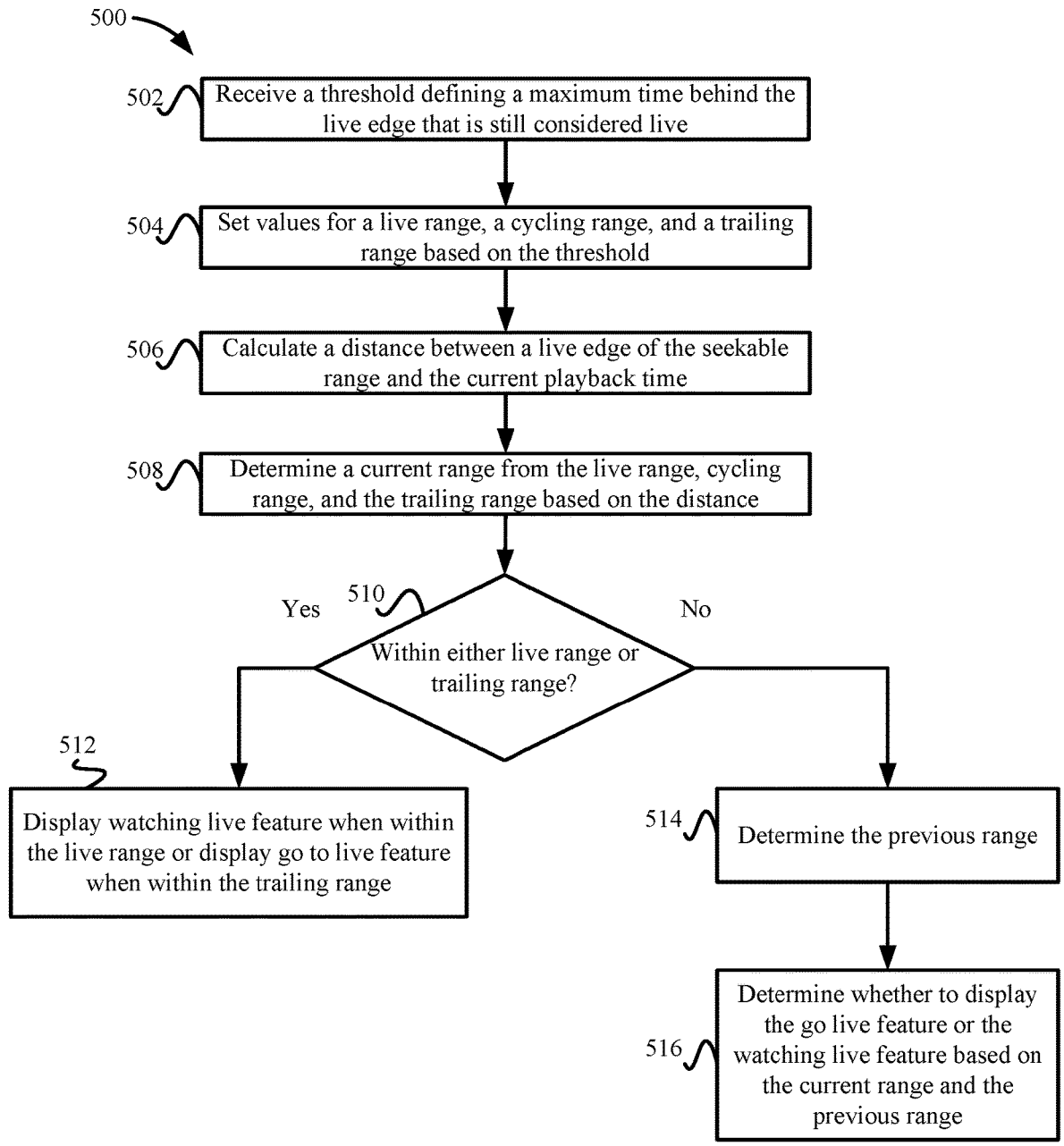
FIG. 5 depicts a simplified flowchart of a method for using the ranges to determine whether or not to enable the go-to-live feature according to some embodiments.

As discussed above, three different ranges may be used. FIG. 5 depicts a simplified flowchart 500 of a method for using the ranges to determine whether or not to enable the go-to-live feature according to some embodiments. At 502, live edge detection engine 110 receives a threshold defining a maximum time behind the live edge that is still considered live. For example, the threshold may be determined based on the amount of time the seekable range is increased when a new manifest is received. If the amount of time that each manifest increases the seekable range is six seconds, then the threshold should be greater than six seconds.

At 504, live edge detection engine 110 sets the values for a live range, a cycling range, and a trailing range based on the threshold. For example, the live range may be the values of [0, threshold]; the cycling range may be the values of (threshold, threshold*2]; and the trailing range may be from (threshold*2, infinity). It will be understood that other values for the ranges may be set. In this example, if the threshold is ten seconds, then the live range is 0 to 10 seconds; the cycling range is greater than 10 seconds to 20 seconds; and the trailing range is greater than 20 seconds to infinity. The values mean that the user is in the live range if the user is within 10 seconds of the live edge, within the cycling range if the current playback time is within greater than 10 seconds to 20 seconds of the live edge; and within the trailing range if the current playback time is greater than 20 seconds from the live edge. The live range and the cycling range do not need to be the same size. However, both the live range and the cycling range may be larger than the increase in the seekable range when a new manifest is received.

At 506, live edge detection engine 110 calculates a distance between the live edge of the seekable range and the current playback time. At 508, live edge detection engine 110 determines a current range from the live range, cycling range, and trailing range based on distance. For example, live edge detection engine 110 may determine the distance by taking the difference from the live edge to the current playback time. Live edge detection engine 110 determines the current range by applying the distance to the values for the three ranges. For example, if the distance is five seconds, then the user is within the live range; if the distance is fifteen seconds, then the user is within the cycling range; and if the distance is 25 seconds, then the user is within the trailing range.

At 510, live edge detection engine 110 determines whether the current range is within either the live range or the trailing range. If the current range is within either of the live range or the trailing range, at 512, live detection engine 110 displays the go-to-live feature when the current range is within the live range or displays the watching-live feature when the current range is within the trailing range.

If the current range is within the cycling range, then live detection engine 110 may analyze the previous range to determine which feature to enable. When in the cycling range, at 514, live edge detection engine 110 determines the previous range. For example, the previous range may be one of the live range, cycling range, and trailing range. In some embodiments, a starting state may be the live range. Then, at 516, live edge detection engine 110 determines whether to display the go-to-live feature or the watching-live feature based on the current range and the previous range. For example, if the previous range is the live range and then the cycling range is entered, live edge detection engine 110 considers the state to be watching-live until the current range enters the trailing range. If the previous range is the trailing range and the current range is the cycling range, live edge detection edge 110 does not change the feature to the watching-live feature until the current range enters the live range. If the previous range is the cycling range, live edge detection engine 110 may not enable the watching-live feature until the current range enters the live range. However, other default behavior may be used when the previous range is the cycling range.

The above logic limits cycling between states because when a manifest update causes the current range to go from the live range to the cycling range or from the traveling range to the cycling range, live edge detection engine 110 does not change current enabled feature. This method avoids changes that occur due to receiving a new manifest because the threshold is larger than the amount of time the manifest increases the seekable range by. Also, there will be a manifest update before the current playback time can cross the entire cycling range because it will take the threshold time to go through the entire cycling range and there will be a manifest update within that time. Accordingly, using the three ranges avoids cycling between enabling and disabling the go-to-live feature when manifest updates occur. This improves the display of the interface because go-to-live button does not flicker when it is enabled or disabled when manifest updates are received. Further, when flickering occurs, the user may attempt to select one of the buttons, but another button is displayed when the selection is received due to the flickering. This causes an action to be performed that the user may not have wanted. Additionally, computing resources are saved because application 108 does not have to process and display the cycling between the features.

Examples of Changes in Ranges

Figure 6A:
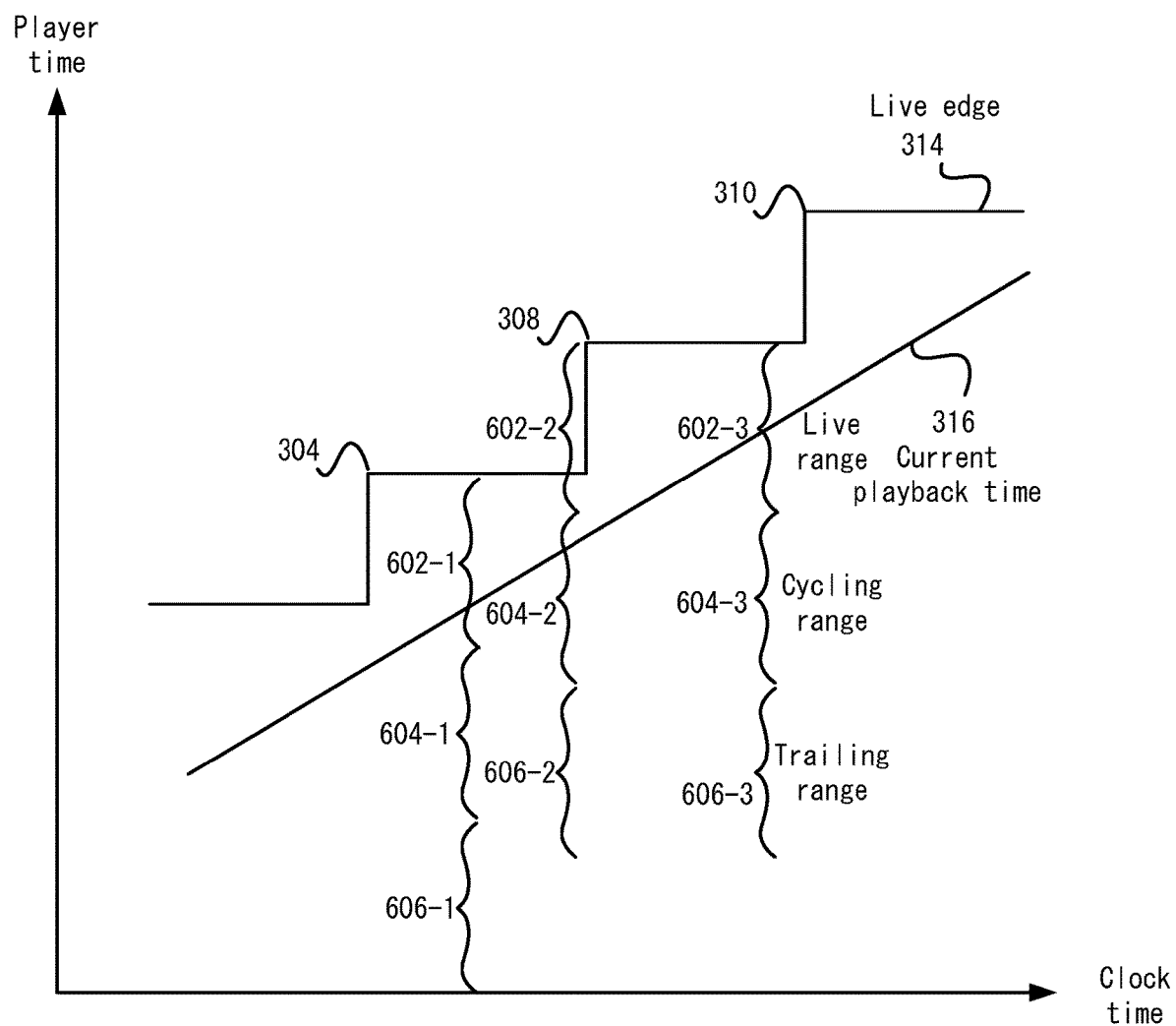
FIG. 6A depicts an example when the playback starts in the live range according to some embodiments.
Figure 6B:
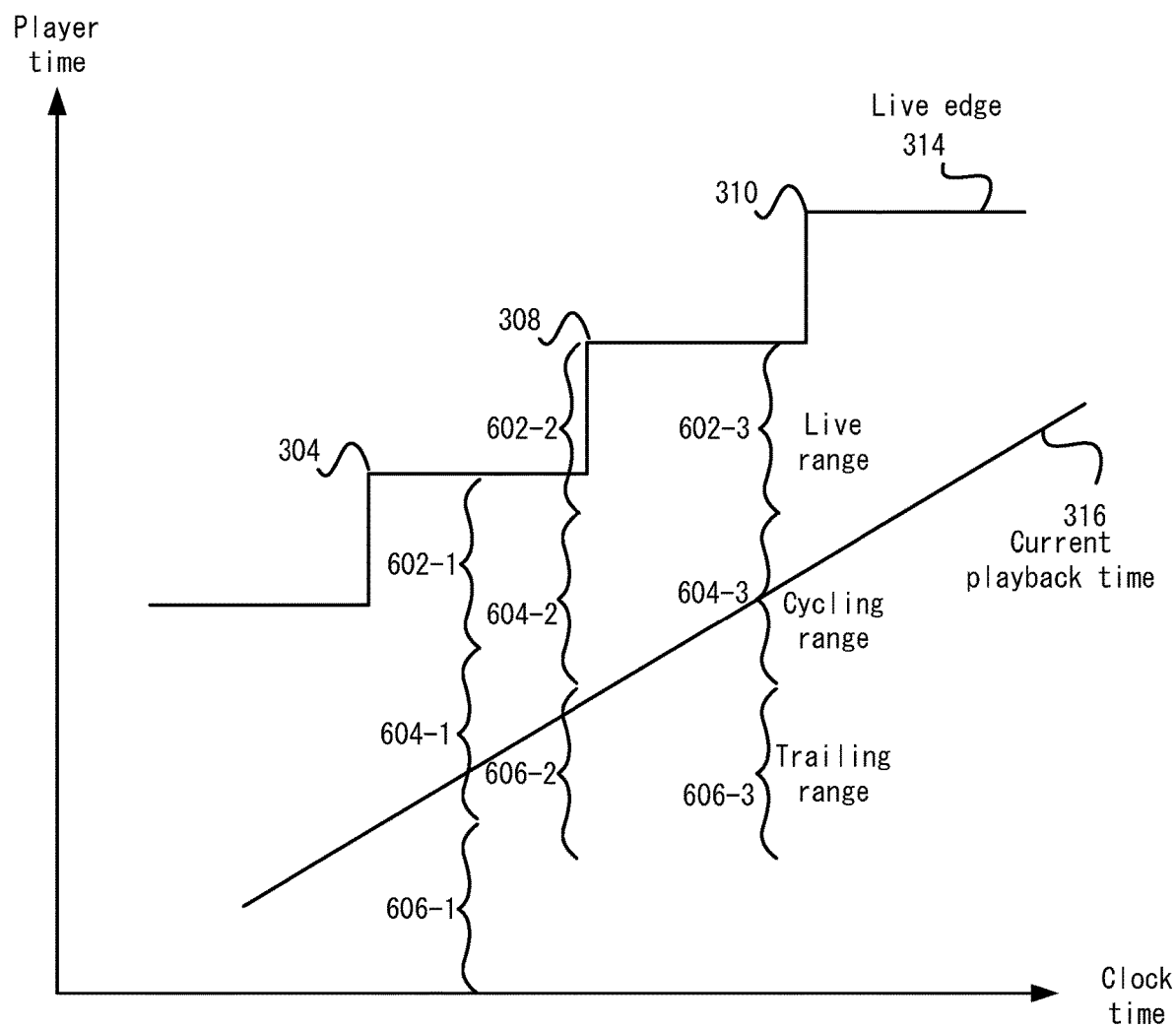
FIG. 6B depicts an example when playback starts in the trailing range according to some embodiments.

FIGS. 6A and 6B depict the example of the current playback time proceeding the different ranges according to some embodiments. FIG. 6A depicts an example when the playback starts in the live range according to some embodiments. The live range is shown at 602-1 to 602-3; the cycling range is shown at 604-1 to 604-3; and the trailing range is shown at 606-1 to 606-3. The ranges are applied at three different points in time. At 602-1, 604-1, and 606-1, the current playback time is in the live range at 602-1. Then, when a manifest update occurs at 308, the current playback time falls back to the cycling range shown at 604-2. Using the cycling range, application 108 does not change from the watching-live state to the not watching-live state. As the media program continues to play from point 308 to before point 310, the current playback time increases while the live edge stays the same. Eventually, the current playback time reaches the live range at 602-3. By using the three ranges, live edge detection engine 110 does not change from the watching-live feature at 604-1 to the go-to-live feature at 604-2, and then back to the watching-live feature at 602-3. Rather, live edge detection engine 110 may enable the watching-live feature in spite of the manifest update. Because only the manifest update has occurred to change the distance from the live edge, application 108 does not switch between the watching-live state to the not watching-live state, which does not cause the cycling between go-to-live button 202 and watching-live button 212.

FIG. 6B depicts an example when playback starts in the trailing range according to some embodiments. At 606-2, the current playback time is within the trailing range. At this point, live edge detection engine 110 enables the go-to-live feature. Then, as playback continues, the distance from the live edge then moves into the cycling range at 604-3. However, live edge detection engine 110 does not disable to go-to-live feature when in the cycling range. This prevents a flickering from disabling the go-to-live feature when in the cycling range 604-3.

Client Device 102

Figure 7:
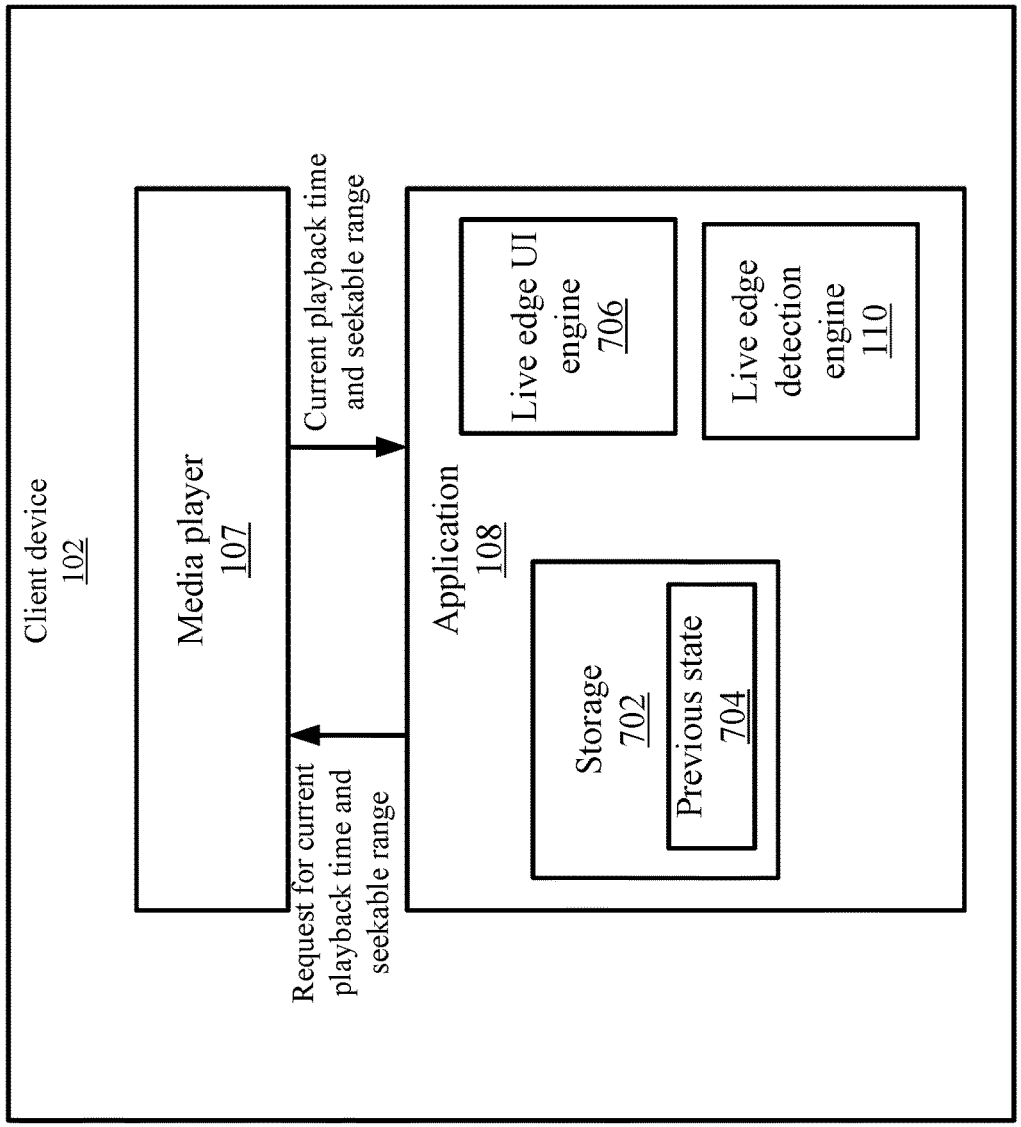
FIG. 7 depicts a more detailed example of a client device according to some embodiments.

FIG. 7 depicts a more detailed example of client device 102 according to some embodiments. Application 108 may send requests for a current playback time and seekable range to media player 106. Media player 106 may then send the current playback time and seekable range to application 108.

Application 108 may include storage 702 that stores the previous state 704. The previous state may be the state right before application 108 calculates the current state. Live edge detection engine 110 may then generate the current state and compare that with the previous state. Then, depending on which range the current state falls within, live edge detection engine 110 may direct a live edge UI engine 706 to either enable the go-to-live feature or watching-live feature. Live edge UI engine 706 may then determine which feature to display in media player 106, such as the go-to-live button 202 or the watching-live button 212.

As discussed above, the go-to-live feature and watching-live feature may only be used when the user has enabled the features, such as when the user selects a menu to be displayed in media player 106. If the user has not enabled the menu, then live edge UI engine 706 may not display the go-to-live button 202 or the watching-live button 212. Also, if the menu is not displayed, then live edge detection engine 110 may not perform the calculations to determine if the go-to-live feature or watching-live feature should be enabled. However, in other embodiments, live edge detection engine 110 may continuously perform the analysis. Then, only when the menu is enabled, live edge UI engine 706 may determine whether to display the go-to-live button 202 or the watching-live button 212.

CONCLUSION

Accordingly, some embodiments may provide an improved user interface that decreases the flickering of the go-to-live button and watching-live button due to manifest updates. Additionally, some embodiments may improve the analysis by using three feature ranges to lessen the flickering especially when a manifest update affects the calculation. A first range is the live range where the user is considered watching live, a second range is a cycling range where the user state is not changed, and a third range is trailing range where the user is considered not watching live. Further, by providing the go-to-live button, a user can automatically seek to the furthest seekable range with one input. The user does not have to drag the indicator to the end of the seekable range or fast forward to seek to the live edge.

System

Figure 8:
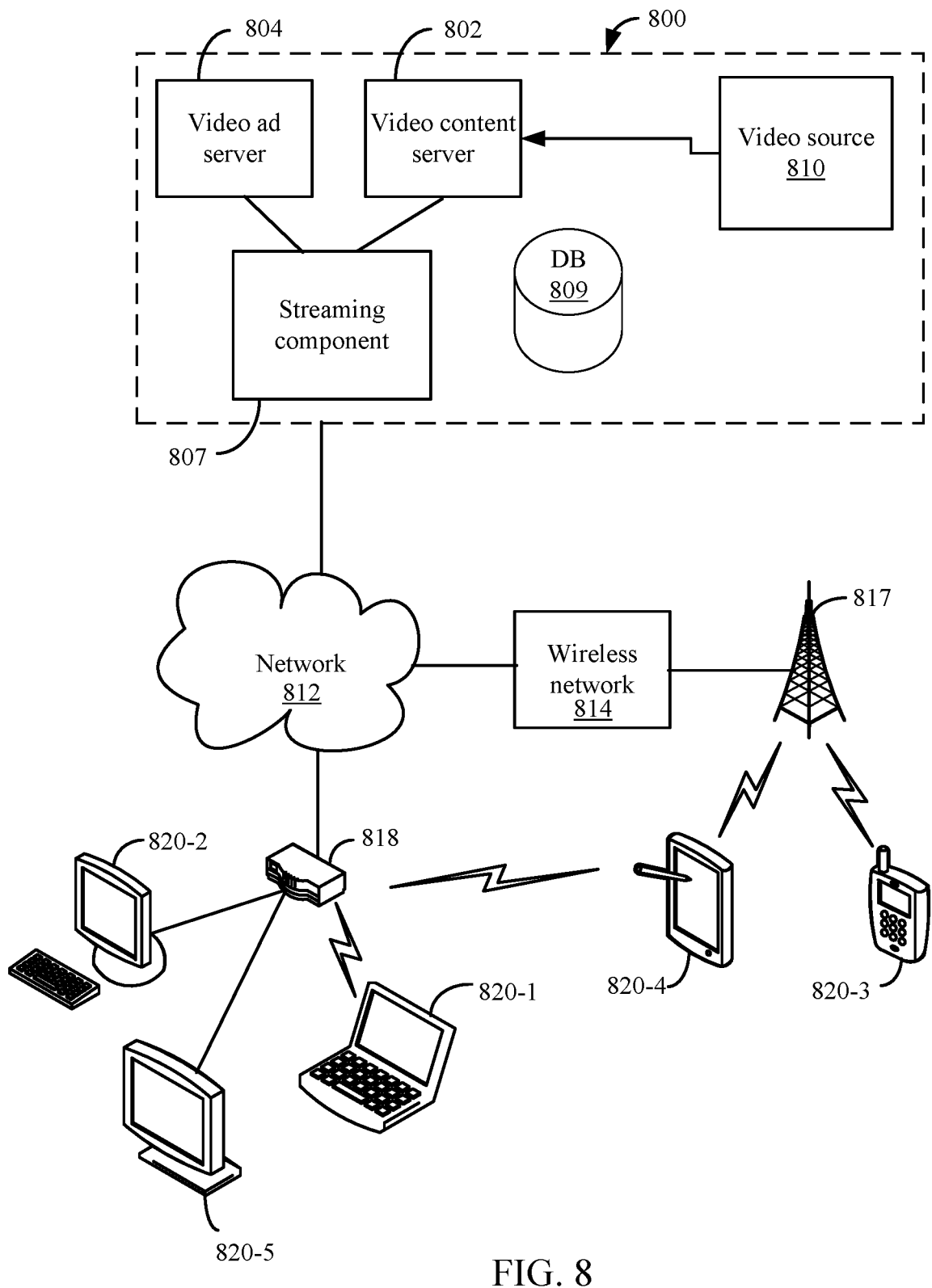
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, game consoles, streaming sticks, set-top-boxes, or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
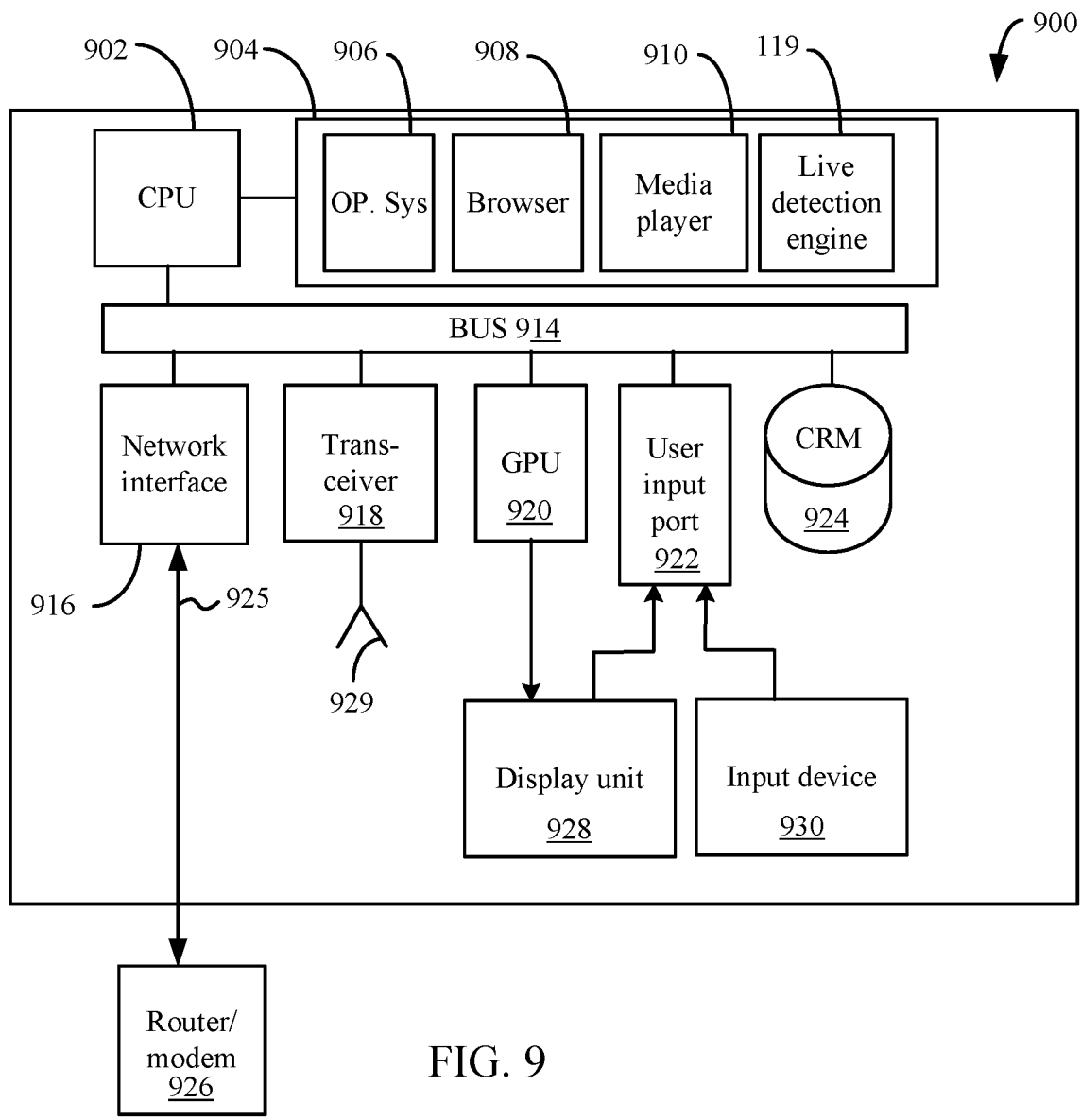
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include live detection engine 110. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium (CRM) in a storage device 924 may be connected to the bus 914 and store static information and instructions for the processor 902; for example, the storage device (CRM) 924 may store the modules 906, 908, and 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   calculating, by a computing device, a latest seekable point for a live edge of a media program, wherein the latest seekable point for the live edge corresponds to a latest time in the media program that can be played within a threshold;
   determining, by the computing device, a current playback position of the media program;
   selecting, by the computing device, among a first range, a second range, and a third range based on the current playback position and the latest seekable point; and
   enabling, by the computing device, a first feature when the first range is selected, enabling a second feature when the second range is selected, and not changing whichever of the first feature or the second feature that is currently enabled to continue displaying whichever of the first feature and the second feature that is currently enabled when the third range is selected.

2. The method of claim 1, wherein when the third range is selected, not changing the displaying of whichever of the first feature and the second feature that is currently being displayed on an interface.

3. The method of claim 1, wherein enabling the first feature comprises:
   displaying the first feature on an interface during playback of the media program.

4. The method of claim 3, wherein the first feature includes a message indicating the playback of the media program is in a live state.

5. The method of claim 3, wherein the first feature does not perform any actions when selected.

6. The method of claim 1, wherein enabling the second feature comprises:
   displaying the second feature on an interface during playback of the media program.

7. The method of claim 6, wherein the second feature, when selected, automatically seeks to the live edge.

8. The method of claim 1, wherein one of the first feature and the second feature is displayed on an interface when a menu is enabled by a user.

9. The method of claim 1, wherein:
   when a new manifest is received, the latest seekable point is increased by a time associated with a segment of the new manifest.

10. The method of claim 1, wherein:
    new manifests for intervals of the media program are received during playback of the media program, and each new manifest increases the latest seekable point of the live edge.

11. The method of claim 1, further comprising:
determining the first range, the second range, and the third range using a threshold that defines a maximum time behind the live edge that is still considered live for the media program.

12. The method of claim 11, wherein:
the first range is from the latest seekable point of the live edge to a first value;
the third range is from the first value to a second value; and
the second range is from the second value to a third value.

13. The method of claim 12, wherein the second value is a larger distance from the latest seekable point of the live edge than a distance from the latest seekable point of the live edge to the first value, and the third value is a larger distance from the latest seekable point of the live edge than a distance from the latest seekable point of the live edge to the second value.

14. The method of claim 1, further comprising:
calculating a distance between the latest seekable point and the current playback position; and
comparing the distance to the first range, the second range, and the third range, wherein the distance is used to select the first range, the second range, and the third range.

15. The method of claim 14, further comprising:
when the distance between the current playback position and the latest seekable point is within the first range, enabling the first feature;
when the distance between the current playback position and the latest seekable point is within the second range, enabling the second feature; and
when the distance between the current playback position and the latest seekable point is within the third range, not changing whichever of the first feature or the second feature that is currently enabled to continue displaying whichever of the first feature and the second feature that is currently being displayed.

16. A non-transitory computer-readable storage medium containing instructions, that when executed, control a computer system to be operable for:
calculating a latest seekable point for a live edge of a media program, wherein the latest seekable point for the live edge corresponds to a latest time in the media program that can be played within a threshold;
determining a current playback position of the media program;
selecting among a first range, a second range, and a third range based on the current playback position and the latest seekable point; and
enabling a first feature when the first range is selected, enabling a second feature when the second range is selected, and not changing whichever of the first feature or the second feature that is currently enabled to continue displaying whichever of the first feature and the second feature that is currently enabled when the third range is selected.

17. The non-transitory computer-readable storage medium of claim 16, wherein enabling the second feature comprises:
displaying the second feature on an interface during playback of the media program.

18. The non-transitory computer-readable storage medium of claim 17, wherein the second feature, when selected, automatically seeks to the live edge.

19. The non-transitory computer-readable storage medium of claim 16, wherein:
new manifests for intervals of the media program are received during playback of the media program, and
each new manifest increases the latest seekable point of the live edge.

20. An apparatus comprising:
one or more computer processors; and
a non-transitory computer-readable storage medium comprising instructions, that when executed, control the one or more computer processors to be operable for:
calculating a latest seekable point for a live edge of a media program, wherein the latest seekable point for the live edge corresponds to a latest time in the media program that can be played within a threshold;
determining a current playback position of the media program;
selecting among a first range, a second range, and a third range based on the current playback position and the latest seekable point; and
enabling a first feature when the first range is selected, enabling a second feature when the second range is selected, and not changing whichever of the first feature or the second feature that is currently enabled to continue displaying whichever of the first feature and the second feature that is currently enabled when the third range is selected.

* * * * *